(12) United States Patent
Bailey et al.

(10) Patent No.: US 8,607,045 B2
(45) Date of Patent: Dec. 10, 2013

(54) TOKENCODE EXCHANGES FOR PERIPHERAL AUTHENTICATION

(75) Inventors: Daniel Vernon Bailey, Pepperell, MA (US); John G. Brainard, Sudbury, MA (US); Burton S. Kaliski, Jr., Wellesley, MA (US); Michael Szydlo, Brighton, MA (US)

(73) Assignee: EMC Corporation, Hopkinton, MA (US)

( * ) Notice: Subject to any disclaimer, the term of this patent is extended or adjusted under 35 U.S.C. 154(b) by 1946 days.

(21) Appl. No.: 11/530,655

(22) Filed: Sep. 11, 2006

(65) Prior Publication Data

US 2007/0061566 A1 Mar. 15, 2007

Related U.S. Application Data

(60) Provisional application No. 60/715,483, filed on Sep. 9, 2005.

(51) Int. Cl.
*G06F 21/00* (2013.01)

(52) U.S. Cl.
USPC .......................................... 713/168; 713/169

(58) Field of Classification Search
None
See application file for complete search history.

(56) References Cited

U.S. PATENT DOCUMENTS

| | | | | |
|---|---|---|---|---|
| 5,361,062 A | * | 11/1994 | Weiss et al. | 340/5.26 |
| 5,841,871 A | * | 11/1998 | Pinkas | 713/155 |
| 7,536,722 B1 | * | 5/2009 | Saltz et al. | 726/20 |
| 2001/0055388 A1 | | 12/2001 | Kaliski, Jr. | |
| 2002/0194499 A1 | * | 12/2002 | Audebert et al. | 713/201 |
| 2003/0217148 A1 | * | 11/2003 | Mullen et al. | 709/225 |
| 2004/0030932 A1 | | 2/2004 | Juels et al. | |
| 2006/0064588 A1 | * | 3/2006 | Tidwell et al. | 713/169 |

FOREIGN PATENT DOCUMENTS

WO  WO 2006/014358 A1  2/2006

OTHER PUBLICATIONS

1. RSA Laboratories, "PKCS #11 v2.20: Cryptographic Token Interface Standard," Version 2.20, 46 pages, Jun. 28, 2004.
2. RSA Laboratories, "PKCS #11 v2.20 Amendment 1: Mechanisms for One-Time Password Tokens," Version 2.20, pp. 1-28, Dec. 27, 2005.
U.S. Appl. No. 09/802,485, filed Mar. 9, 2001, "System and Method for Increasing the Security of Encrypted Secrets and Authentication."
U.S. Appl. No. 09/356,600, filed Jul. 19, 1999, "System and Methods for Maintaining and Distributing Personal Security Devices."

* cited by examiner

*Primary Examiner* — Philip Chea
*Assistant Examiner* — Carlton Johnson
(74) *Attorney, Agent, or Firm* — Ryan, Mason & Lewis, LLP

(57) ABSTRACT

In a system comprising a transient storage device (TSD) or other type of peripheral configured for communication with a host device, a first one-time password or other type of code is generated in the peripheral and transmitted to the host device. The first code is presented by the host device to an authentication server for authentication. The host device receives a second one-time password or other type of code from the authentication server and transmits it to the peripheral for authentication.

26 Claims, 2 Drawing Sheets

100

TOKENCODE EXCHANGES FOR PERIPHERAL AUTHENTICATION

RELATED APPLICATION(S)

The present application claims the priority of U.S. Provisional Patent Application Ser. No. 60/715,483, filed Sep. 9, 2005 and entitled "Tokencode Exchanges for Peripheral Authentication," the disclosure of which is incorporated by reference herein.

FIELD OF THE INVENTION

The present invention relates generally to cryptographic techniques for authentication over a network or in other types of communication systems.

BACKGROUND OF THE INVENTION

Information technology (IT) organizations have become adept at selectively allowing access to file servers and other important resources to only particular trusted hosts. For example, a typical corporate policy will allow only company-owned and -supported laptops to be attached to a corporate network. Personal laptops, on the other hand, are not permitted the same access. Often the host media access control (MAC) address is used as a filtering mechanism to deny network access.

The recent widespread availability of low-cost flash memory has led to a proliferation of what are referred to herein as transient storage devices (TSDs). Often equipped with a universal serial bus (USB) interface, these key fob sized devices are available in capacities up to several gigabytes. Such devices may also be referred to as personal portable storage devices or USB flash drives. These simple devices tend to offer no security features of their own. This means that an employee may bridge the gap between trusted resources and an untrusted host by copying the data onto a TSD and then onto the untrusted host. Some enterprise IT administrators have begun to block the use of TSDs altogether to avoid this problem.

Recently, the Institute of Electrical and Electronics Engineers (IEEE) has formed a working group specifically to address this problem. The IEEE 1667 committee is looking at ways to authenticate hosts and TSDs to prevent the sort of breach described above. An early draft of the committee's work suggests a public-key approach. In this model, some measure of access control is provided by performing entity authentication. In addition, as is often found in secure networking standards, it is assumed that within a particular trust domain, any device that can be authenticated is automatically authorized to access the requested resources. In this case, the resource would be read or write access to a TSD.

Unfortunately, a public-key approach to TSD access presents some problems. For example, the cryptographic functions required for implementation of the public-key approach can be expensive in terms of communication bandwidth, circuit area, computation time, and power consumption. Also, a public-key model may require home and small business users to obtain digital certificates either purchased at retail or from a self-administered certifying authority, which can be costly and inconvenient.

It is therefore apparent that a need exists for a simple and effective approach to authentication of TSDs and other peripherals which avoids the drawbacks of public-key cryptography in this context.

SUMMARY OF THE INVENTION

The present invention in the illustrative embodiments described herein meets the above-identified need by providing a TSD authentication approach based on one-time passwords or other types of codes.

In accordance with one aspect of the invention, a system comprises a TSD or other type of peripheral configured for communication with a computer or other type of host device. For example, the peripheral may be configured for physical attachment to the host device via a USB port of the host device, or may be configured for wireless communication with the host device. The host device may be configured for communication with an authentication server, for example, over the Internet or other type of network. In operation, a first one-time password or other type of code is generated in the peripheral and transmitted to the host device. The first code is presented by the host device to the authentication server for authentication. The host device receives a second one-time password or other type of code from the authentication server and transmits it to the peripheral for authentication.

The order of the authentication operations carried out by the authentication server and the peripheral may vary in different embodiments. For example, the authentication server may generate the second code responsive to presentation of the first code by the host device. Also, the authentication server may authenticate the first code before providing the second code to the host device. In other embodiments, the peripheral may generate the first code responsive to receipt of the second code from the host device, and may authenticate the second code before transmitting the first code to the host device.

In the illustrative embodiments, the first and second codes are derived from respective first and second seeds stored in both the peripheral device and the authentication server. As a more particular example, the first and second codes may be generated in the respective peripheral and authentication server as a cryptographic function of the respective first and second seeds and a current output of a time-of-day clock. The first and second seeds may be derived from a common master seed.

In accordance with another aspect of the invention, a key derivation function may be applied to a combination of the first and second codes to generate session keys for protecting data communicated between the peripheral and the authentication server. By way of example, one or more session keys may be generated as a cryptographic function of a combination of at least the first and second codes and the first and second seeds.

In accordance with yet another aspect of the invention, at least first and second sets of future codes may be cached in the host device for use in one or more periods of off-line operation when the host device is unable to communicate with the authentication server.

The illustrative embodiments advantageously overcome the drawbacks of the conventional public-key approach as applied to TSD access. For example, the tokencode exchange approach can be implemented using less communication bandwidth, circuit area, computation time, and power consumption than the public-key approach. Also, purchase and management of digital certificates can be avoided.

These and other features and advantages of the present invention will become more readily apparent from the accompanying drawings and the following detailed description.

DETAILED DESCRIPTION

The present invention will be described herein with reference to an example communication system in which a TSD connects to a computer or other host device and the host device communicates over a network with an authentication server. It is to be appreciated, however, that the invention is not restricted to use in this or any other particular system configuration.

Additional details regarding certain conventional cryptographic techniques referred to herein may be found in, e.g., A. J. Menezes et al., Handbook of Applied Cryptography, CRC Press, 1997, which is incorporated by reference herein.

The term "code" as used herein is intended to include authentication information such as one-time passwords or other tokencodes, or more generally any other information that a user may be required to submit in order to obtain access to an access-controlled application or other resource. Although the illustrative embodiments will be described below in the context of tokencodes, it is to be appreciated that the invention is more broadly applicable to any other type of authentication information.

The present invention in an illustrative embodiment provides techniques for tokencode exchanges between a peripheral and an authentication server. In the illustrative embodiment, the peripheral comprises a TSD, such as a USB flash drive or other type of personal portable storage device.

The term "peripheral" as used herein is intended to be construed broadly, so as encompass any other type of processing device that may be coupled to a host using a wired or wireless connection and can be authenticated via communication between the host and an authentication server. Similarly, the term "authentication server" should be understood to encompass any type of processing device or set of such devices that is operative to authenticate a TSD or other type of peripheral. It need not be a network-based server, and may be implemented as a portion of a device that performs other functions, as a combination or multiple servers or other devices, or in other forms.

Figure 1:
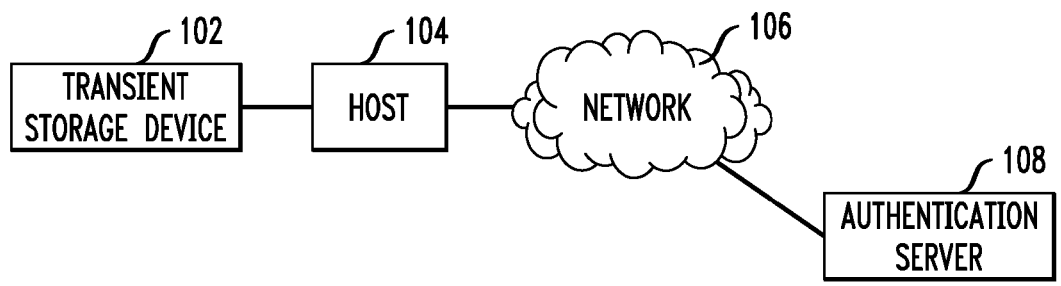
FIG. 1 is simplified block diagram showing one example of a communication system in an illustrative embodiment of the invention.

FIG. 1 shows a simplified network-based communication system 100 which will be used to illustrate the tokencode exchange techniques of the illustrative embodiment. The system 100 includes a TSD 102, a host device 104, a network 106 and an authentication server 108.

As noted above, the TSD 102 may comprise a USB flash drive or other type of personal portable storage device. The TSD is coupled to the host device 104 in a conventional manner. For example, the TSD may be physically attached to the host device via a USB interface connection or other type of wired connection. Alternatively, the TSD may communicate via a wireless connection with the host device, such as a Bluetooth or IEEE 802.11 connection.

The host device 104, also referred to herein as simply a host, may comprise a desktop or portable personal computer, mobile telephone, personal digital assistant (PDA), wireless email device, workstation, kiosk, television set-top box, game console, or any other information processing device that supports connection with a TSD.

The network 106 may comprise, for example, a global computer network such as the Internet, a wide area network (WAN), a local area network (LAN), a satellite network, a telephone or cable network, or various portions or combinations of these and other types of networks.

An authentication process implemented by the TSD 102, the host 104 and the authentication server 108 will be described in greater detail below in conjunction with the flow diagram of FIG. 3.

It is to be appreciated that a given embodiment of the system 100 may include multiple instances of TSD 102, host device 104, authentication server 108, and possibly other system components, although only single instances of such components are shown in the simplified system diagram for clarity of illustration.

In the illustrative embodiment, both the TSD 102 and the authentication server 108 are configured to generate tokencodes in the form of one-time passwords. Such tokencodes may be generated in a conventional manner, using techniques that are well known to those skilled in the art. For example, the tokencodes may be generated using a time-synchronous or event-based algorithm of a type used in a typical conventional security token. One particular example of a well-known type of security token is the RSA SecurID® hardware-based user authentication token commercially available from RSA Security Inc. of Bedford, Mass., U.S.A.

Figure 2A:
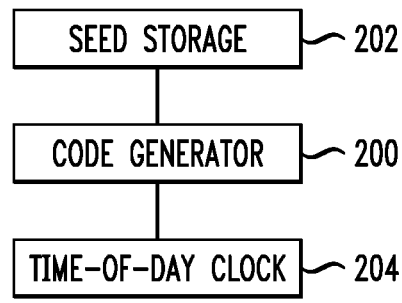
FIG. 2A shows tokencode generation circuitry that may be included in both a TSD and an authentication server in the FIG. 1 system.

FIG. 2A illustrates one possible arrangement of tokencode generation circuitry that may be implemented in both the TSD 102 and the authentication server 108 in the system 100 of FIG. 1. The circuitry in this implementation includes a code generator 200 coupled to seed storage 202 and a time-of-day clock 204. The seed storage stores one or more seeds that are used to generate tokencodes in the code generator based on a current output of the time-of-day clock in accordance with a time-synchronous algorithm. The tokencodes may be generated using a one-way cryptographic function such as a block cipher or hash function implemented in the code generator 200. Although this arrangement utilizes a time-synchronous algorithm, any other technique for generating tokencodes may be used in implementing the system. Numerous such techniques for generating tokencodes are known in the art, and will therefore not be described in detail herein.

Figure 2B:
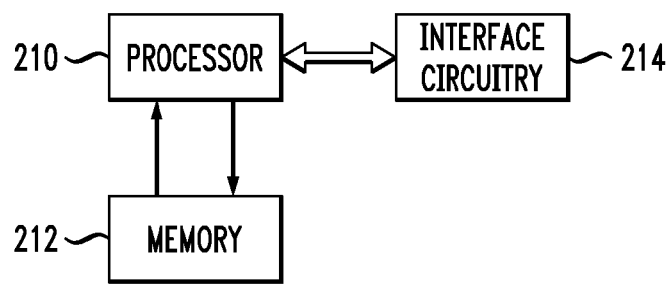
FIG. 2B illustrates one possible implementation of a given TSD, authentication server or other processing device of the FIG. 1 system.

With reference now to FIG. 2B, an exemplary implementation of a given processing device of the FIG. 1 system is shown. The processing device as shown may be viewed as representing, for example, TSD 102, host device 104, or authentication server 108. The processing device in this implementation includes a processor 210 coupled to a memory 212 and interface circuitry 214. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, portions of an authentication process in accordance with an embodiment of the invention can be implemented at least in part in the form of one or more software programs that are stored in memory 212 and executed by the corresponding processor 210. The memory 212 may also be used for storing information used to perform code generation or other operations associated with the authentication process. The memory 212 is an example of what is more generally referred to herein as a machine-readable storage medium.

Figure 3:
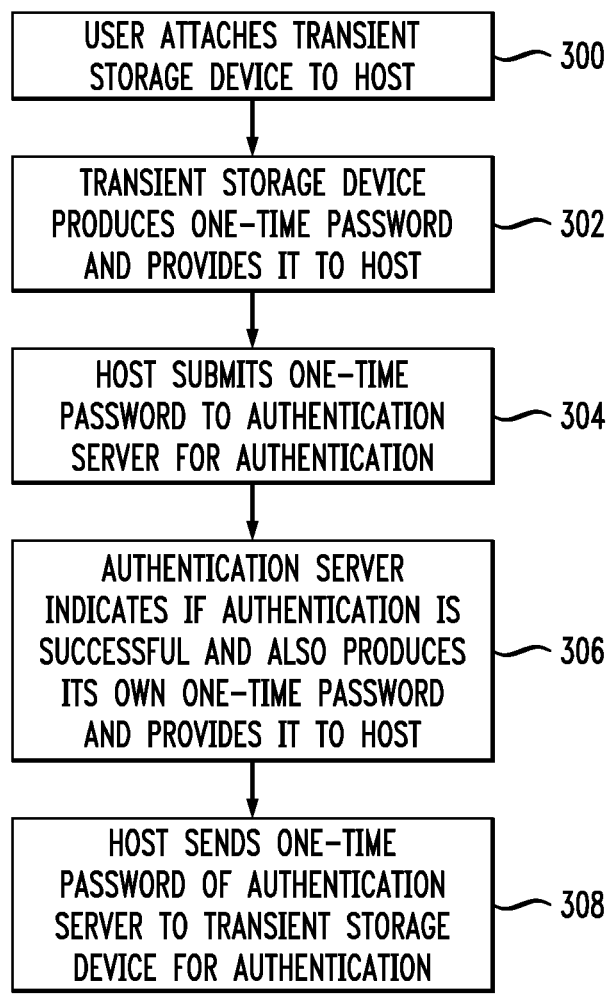
FIG. 3 is a flow diagram showing an authentication process in an illustrative embodiment of the invention.

FIG. 3 shows an authentication process that is carried out between elements 102, 104 and 108 in the system 100 of FIG. 1. In this process, the authentication server 108 authenticates the TSD 102 and host 104 based on a one-time password generated by the TSD. In addition, the host authenticates itself to the TSD using a one-time password supplied by the authentication server. The TSD and authentication server thus exchange tokencodes in the form of one-time passwords that are used for mutual authentication.

The one-time passwords are generated by the TSD 102 and authentication server 108 may be derived from respective first and second seeds stored in both the TSD and the authentication server. The first and second seeds may be derived from a common master seed stored in both of these system elements, which would allow the TSD to save on storage while potentially supporting multiple authentication servers.

The authentication process in this embodiment may be viewed as a type of symmetric key authentication system. Each individual one-time password may be securely derived from the appropriate seed by, for example, combining it with either the time of day or a counter using a one-way cryptographic function such as a block cipher or hash function. The nature of these primitives means that interception of a particular tokencode provides the attacker with practically no information about the seed shared by the TSD and the authentication server. These cryptographic functions are far less expensive in terms of communication bandwidth, circuit area, computation time, and power consumption than their public-key counterparts. For example, the above-noted RSA security tokens can last for more than seven years on a single coin cell battery that provides 150 mAH of current.

For the authentication of the TSD 102 to the authentication server 108, the process is similar to well-known conventional user authentication using the above-described security tokens. However, the authentication server will also want to know that the host is trusted. Fortunately, as was mentioned above, IT organizations already have mechanisms in place to prevent untrusted hosts from attaching to their networks. For this reason, the authentication server can make use of this implicit trust and may only perform basic checks on the host such as a check of its IP address.

As indicated previously, the authentication process of FIG. 3 also involves the authentication server 108 generating its own one-time password and delivering it to the TSD 102 via the host 104. This provides assurance to the TSD that it has not been attached to an untrusted host.

In this embodiment, as indicated previously, the TSD 102 keeps track of two seeds, one to authenticate itself to the authentication server 108, and one to authenticate the authentication server.

Referring now to the particular steps shown in the flow diagram of FIG. 3, the user in step 300 attaches the TSD 102 to the host 104. Although this attachment may be via a physical connection, for example, by plugging the TSD into a USB port of the host, wireless attachment may alternatively be used, as was mentioned above. Once attached to the host, the TSD in step 302 produces a current one-time password and provides that one-time password to the host. Such a one-time password is also referred to herein as a tokencode. The one-time password may be provided via a standardized interface, such as PKCS #11, described in RSA Laboratories, "PKCS #11: Cryptographic Token Interface Standard," Version 2.20, June 2004, and "PKCS #11 Mechanisms for One-Time Password Tokens," Version 2.20, Amendment 1, Dec. 2005, which are incorporated by reference herein.

Although not reflected in the figure, the user may be prompted to supply the host with additional authentication information, such as a personal identification number (PIN).

The host 104 in step 304 submits the one-time password and any additional authentication information to the authentication server 108. This information may be transmitted via an otherwise conventional web services exchange, or using any other type of information exchange.

Since the authentication server knows the identity of the host, the seed residing in the TSD, and the user PIN or other authentication information if present, it knows which one-time password to expect and thus can determine if this host is trusted. Based on this expectation, it can return a message indicating success or failure of the authentication to the host, as indicated in step 306.

Upon receipt of an indication of successful authentication by the authentication server 108, the host 104 now knows that a legitimate trusted TSD is attached. By way of contrast, a revoked TSD may have had its seed removed from the authentication server database.

Also in step 306, the authentication server 108 produces its own one-time password and provides it to the host 104. The one-time password of the authentication server may be determined, for example, as a function of the one-time password of the TSD 102 and other data, such as a seed stored by the authentication server. Additional or alternative data, such as a current output of a time-of-day clock, may be used in generating a one-time password. In other embodiments, the one-time password of the authentication server need not be a function of the one-time password of the TSD, and may be based, for example, on only a seed, or on a seed and additional data. Similar techniques may be used by the TSD in producing its one-time password in step 302.

The host device in step 308 sends the one-time password of the authentication server to the TSD for authentication. This advantageously provides the TSD with assurance that it has not been attached to an untrusted host, as mentioned above. The TSD knows the seed used by the authentication server to generate its one-time password, and thus can authenticate the proffered password.

In the embodiment of FIG. 3, the authentication server 108 may generate its one-time password responsive to presentation of the one-time password of the TSD 102 by the host device 104. Also, the authentication server may authenticate the one-time password of the TSD before providing its own one-time password to the host device.

However, it should be noted that this ordering of the authentication operations in the steps shown in FIG. 3 may be varied in other embodiments. For example, the authentication server 108 may provide its one-time password to the host device 104 for delivery to the TSD 102 before the TSD produces its one-time password for delivery to the authentication server via the host device. Such an arrangement would allow the TSD to authenticate the authentication server before the authentication server authenticates the TSD. Other alternative arrangements of these operations are possible. Thus, the TSD may generate its one-time password responsive to receipt of the one-time password of the authentication server from the host device. Also, the TSD may authenticate the one-time password of the authentication server before providing its own one-time password to the host device.

The above-described techniques can be adapted in a straightforward manner to accommodate periods of time for which the host 104 is off line and hence without access to the authentication server 108. In such a mode of operation, the host is not connected to the network 106, and hence cannot forward tokencodes from the TSD 102 to the authentication server, nor can it forward tokencodes from the authentication server to the TSD. This disconnected authentication problem can be solved by appropriate caching of future tokencodes on the host. Thus, while operating in an off-line mode, the host itself can authenticate the TSD by simply looking up the expected TSD tokencode for a particular time of day. Similarly, the host can deliver an expected authentication server tokencode for the particular time of day to the TSD, by reference to a different set of cached tokencodes. Thus, the host utilizes two separate sets of cached tokencodes, the first set corresponding to the TSD to authentication server authentication and the second set corresponding to the authentication server to TSD authentication.

To limit exposure on the host, it is preferable to cache only a limited number of these tokencodes on the host at any one time, such as a number sufficient to cover several consecutive days of off-line operation. Once the supply of cached tokencodes has been exhausted, the host must reconnect to the authentication server via the network to obtain more tokencodes. The cached tokencodes are preferably stored on the host in an encrypted manner to prevent disclosure.

An additional advantage of the above-described approach is that it allows for efficient reauthentication if desired. For example, if one wants to prevent session hijacking, one can simply require that tokencodes be periodically exchanged, say every 60 seconds or 60 minutes depending on the level of sensitivity.

A given embodiment of the invention may also be configured to provide data origin authentication in addition to the above-described entity authentication. Many modern protocols including Secure Sockets Layer (SSL) use an entity authentication protocol exchange to additionally establish bulk data encryption and integrity keys. For those TSDs that use a physical attachment point such as a USB port, there may be little need for encryption. However, as wireless technologies proliferate, it is expected that more TSDs will use wireless USB or another type of over-the-air communication which would make encryption more relevant.

Data origin authentication refers generally to an assurance that data came from a particular source, was not modified in transit, and potentially not maliciously replayed. To achieve these goals, SSL uses data integrity keys established for the duration of a particular session together with a cryptographic function called a message authentication code. In practice, to reduce complexity, a message authentication code is often constructed using a block cipher. Applications that additionally require encryption thus do not have to instantiate another cryptographic function to obtain data origin authentication.

There are a number of ways to extend the tokencode exchange of the illustrative embodiment to derive bulk data keys which could be used for encryption or data origin authentication. For example, a key derivation function may be applied to the symmetric keys and the authentication messages exchanged to derive unique unpredictable session keys.

As a more particular example, if the tokencode generation function applied in code generator 200 of the TSD is given by $f$ (seed $\|$ time-of-day), where $f$ is a cryptographic function and $\|$ denotes concatenation, one could use $f$ (seed-from-TSD $\|$ seed-from-server $\|$ tokencode-from-TSD $\|$ tokencode-from-server $\|$ TSD identity $\|$ server identity $\|$ counter). Of course, numerous alternative arrangements could be used for key derivation.

When utilized for data origin authentication, the resulting bulk data keys serve to show the active participation of both TSD and server in the production of subsequent data. This means that this approach could be used to achieve a robust form of transaction signing.

The illustrative embodiments of the invention can be implemented through straightforward extension of existing user authentication arrangements to support acceptance and verification of a tokencode from an authentication server. For example, the above-noted PKCS #11 one-time password interface may be extended in a straightforward manner to allow a TSD or other peripheral to accept and verify a tokencode from the authentication server.

It should be noted that a given TSD could be shipped from the factory in a state that would accept either seeds for a one-time password scheme or static passwords. Once provisioned with one-time password authentication data, the TSD should not accept static password operation. In general, authentication data should be protected from exposure and modification. To provide additional assurance at the time of provisioning, one may choose to directly connect a blank TSD to the authentication server. The authentication server can then generate the necessary seeds and copy them directly into the TSD and its own database.

The illustrative embodiments advantageously overcome the drawbacks of the conventional public-key approach to authentication of TSDs or other peripherals. For example, the tokencode exchange approach can be implemented using less communication bandwidth, circuit area, computation time, and power consumption than the public-key approach. Also, this approach avoids the need for purchase and management of digital certificates. Instead, users may simply use static passwords or subscribe to a one-time password verification service to protect their TSDs.

As mentioned previously herein, the above-described embodiments of the invention are presented by way of illustrative example only. Many variations and other alternative embodiments may be used. For example, although described in the context of TSDs, the techniques are applicable to a wide variety of other types of peripherals, including conventional security tokens. Thus, an alternative embodiment of the invention may comprise an otherwise conventional security token or other type of peripheral configured to accept and verify a tokencode or one-time password from an authentication server. Also, the particular configuration of system elements shown in FIGS. 1 and 2, and their interactions as shown in FIG. 3, may be varied in other embodiments. For example, the ordering of the authentication operations may be varied, as was indicated previously. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An authentication method for use in a system comprising a peripheral configured for communication with a host device, the method comprising the steps of:
    generating a first code in the peripheral;
    transmitting the first code from the peripheral to the host device, the first code being presentable by the host device to an authentication server for authentication;
    receiving in the peripheral from the host device a second code provided to the host device by the authentication server; and
    authenticating the second code in the peripheral;
    wherein authenticating the second code comprises authenticating the authentication server;
    wherein the first code and the second code are generated using a shared symmetric key; and
    wherein the authentication server authenticates the first code before providing the second code to the host device.

2. The method of claim 1 wherein the authentication server generates the second code responsive to presentation of the first code by the host device.

3. The method of claim 1 wherein the peripheral is a transient storage device.

4. The method of claim 1 wherein the host device comprises a computer.

5. The method of claim 1 wherein the peripheral is configured for physical attachment to the host device via a USB port of said device.

6. The method of claim 1 wherein the first and second codes comprise one-time passwords generated in the respective peripheral and authentication server.

7. The method of claim 1 wherein the second code is generated as a function of at least the first code.

8. The method of claim 7 wherein the second code is generated as a function of at least the first code and a seed stored by the authentication server.

9. The method of claim 7 wherein the second code is generated as a function of at least the first code and a current output of a time-of-day clock.

10. The method of claim 1 wherein the first and second codes are derived from respective first and second seeds stored in both the peripheral device and the authentication server.

11. The method of claim 10 wherein the first and second seeds are derived from a common master seed.

12. The method of claim 10 wherein the first and second codes are generated in the respective peripheral and authentication server as a function of the respective first and second seeds and a current output of a time-of-day clock.

13. The method of claim 1 further including the step of applying a key derivation function to a combination of the first and second codes to generate session keys for protecting data communicated between the peripheral and the authentication server.

14. The method of claim 10 wherein one or more session keys are generated as a function of a combination of at least the first and second codes and the first and second seeds.

15. The method of claim 1 further including the step of caching at least first and second sets of future codes in the host device for use in a period of off-line operation when the host device is unable to communicate with the authentication server.

16. A non-transitory machine-readable storage medium storing one or more software programs, wherein the one or more software programs when executed by a processor of the peripheral implement the steps of the method of claim 1.

17. An authentication method for use in a system comprising a peripheral configured for communication with a host device, the method comprising the steps of:
generating a first code in the peripheral;
transmitting the first code from the peripheral to the host device, the first code being presentable by the host device to an authentication server for authentication;
receiving in the peripheral from the host device a second code provided to the host device by the authentication server; and
authenticating the second code in the peripheral;
wherein authenticating the second code comprises authenticating the authentication server;
wherein the first code and the second code are generated using a shared symmetric key; and
wherein the peripheral generates the first code responsive to receipt of the second code from the host device.

18. An authentication method for use in a system comprising a peripheral configured for communication with a host device, the method comprising the steps of:
generating a first code in the peripheral;
transmitting the first code from the peripheral to the host device, the first code being presentable by the host device to an authentication server for authentication;
receiving in the peripheral from the host device a second code provided to the host device by the authentication server; and
authenticating the second code in the peripheral;
wherein authenticating the second code comprises authenticating the authentication server;
wherein the first code and the second code are generated using a shared symmetric key; and
wherein the peripheral authenticates the second code before transmitting the first code to the host device.

19. An apparatus comprising:
a peripheral having a processor coupled to a memory, the peripheral being configured for communication with a host device;
wherein the peripheral is operative to generate a first code and to transmit the first code to the host device, the first code being presentable by the host device to an authentication server for authentication;
wherein the peripheral is further operative to receive from the host device a second code provided to the host device by the authentication server, and to authenticate the second code, the authenticating of the second code comprising authenticating the authentication server;
wherein the first code and the second code are generated using a shared symmetric key; and
wherein the authentication server authenticates the first code before providing the second code to the host device.

20. The apparatus of claim 19 wherein the peripheral is a transient storage device.

21. The apparatus of claim 19 wherein the peripheral is a security token.

22. An authentication method for use in a system comprising a peripheral configured for communication with a host device, the method comprising the steps of:
receiving in the host device a first code from the peripheral;
transmitting the first code from the host device to an authentication server for authentication;
receiving in the host device a second code from the authentication server; and
transmitting the second code to the peripheral for authentication;
wherein authenticating the second code comprises authenticating the authentication server;
wherein the first code and the second code are generated using a shared symmetric key; and
wherein the authentication server authenticates the first code before providing the second code to the host device.

23. An authentication method for use in a system comprising a peripheral configured for communication with a host device, the method comprising the steps of:
receiving in an authentication server a first code delivered from the peripheral via the host device;
authenticating the first code in the authentication server; and
transmitting a second code from the authentication server to the host device, the second code being presentable by the host device to the peripheral for authentication;
wherein authenticating the second code comprises authenticating the authentication server;
wherein the first code and the second code are generated using a shared symmetric key; and wherein the authentication server authenticates the first code before transmitting the second code to the host device.

24. A system comprising:
a peripheral;
a host device configured for communication with the peripheral; and
an authentication server configured for communication with the host device;
wherein a first code from the peripheral is delivered to the authentication server via the host device for authentication;
wherein a second code from the authentication server is delivered to the peripheral via the host device for authentication, the authenticating of the second code comprising authenticating the authentication server;
wherein the first code and the second code are generated using a shared symmetric key; and
wherein the authentication server authenticates the first code before providing the second code to the host device.

25. An apparatus comprising:
a peripheral having a processor coupled to a memory, the peripheral being configured for communication with a host device;
wherein the peripheral is operative to generate a first code and to transmit the first code to the host device, the first code being presentable by the host device to an authentication server for authentication;
wherein the peripheral is further operative to receive from the host device a second code provided to the host device by the authentication server, and to authenticate the second code, the authenticating of the second code comprising authenticating the authentication server;
wherein the first code and the second code are generated using a shared symmetric key; and
wherein the peripheral is further operative to generate the first code responsive to receipt of the second code from the host device.

26. An apparatus comprising:
a peripheral having a processor coupled to a memory, the peripheral being configured for communication with a host device;
wherein the peripheral is operative to generate a first code and to transmit the first code to the host device, the first code being presentable by the host device to an authentication server for authentication;
wherein the peripheral is further operative to receive from the host device a second code provided to the host device by the authentication server, and to authenticate the second code, the authenticating of the second code comprising authenticating the authentication server;
wherein the first code and the second code are generated using a shared symmetric key; and
wherein the peripheral is further operative to authenticate the second code before transmitting the first code to the host device.

* * * * *